United States Patent
Brans

(10) Patent No.: US 10,007,962 B2
(45) Date of Patent: Jun. 26, 2018

(54) SYSTEM FOR TRACKING THE LOCATION AND ACTIVITIES OF PERSONS

(71) Applicant: Actifine NV, Genk (BE)

(72) Inventor: Tim Brans, Genk (BE)

(73) Assignee: ACTIFINE NV, Genk (BE)

( * ) Notice: Subject to any disclaimer, the term of this patent is extended or adjusted under 35 U.S.C. 154(b) by 0 days. days.

(21) Appl. No.: 15/128,582

(22) PCT Filed: Mar. 23, 2015

(86) PCT No.: PCT/IB2015/052103
§ 371 (c)(1),
(2) Date: Sep. 23, 2016

(87) PCT Pub. No.: WO2015/145326
PCT Pub. Date: Oct. 1, 2015

(65) Prior Publication Data
US 2017/0221166 A1  Aug. 3, 2017

(30) Foreign Application Priority Data
Mar. 24, 2014 (BE) .................. 2014/0195

(51) Int. Cl.
| G08B 23/00 | (2006.01) |
|---|---|
| G06Q 50/26 | (2012.01) |
| G06Q 10/08 | (2012.01) |
| G01S 5/00 | (2006.01) |
| G06Q 10/06 | (2012.01) |
| G08B 21/22 | (2006.01) |
| G07C 3/00 | (2006.01) |
| G01S 19/16 | (2010.01) |
| G01S 19/42 | (2010.01) |
| G07C 9/00 | (2006.01) |

(52) U.S. Cl.
CPC ............ *G06Q 50/26* (2013.01); *G01S 5/0081* (2013.01); *G01S 19/16* (2013.01); *G01S 19/42* (2013.01); *G06Q 10/063114* (2013.01); *G06Q 10/0833* (2013.01); *G07C 3/00* (2013.01); *G08B 21/22* (2013.01); *G07C 9/00111* (2013.01)

(58) Field of Classification Search
CPC .... G06Q 50/26; G06Q 10/06; G06Q 10/0833; G01S 5/0081; G01S 19/42
USPC ...................................................... 340/573.4
See application file for complete search history.

(56) References Cited

U.S. PATENT DOCUMENTS

| 9,024,753 B2 * | 5/2015 | Dalley, Jr. ............. G06Q 10/06 340/539.13 |
|---|---|---|
| 2009/0184823 A1 | 7/2009 | Tessier |
| 2009/0232366 A1 | 9/2009 | Okochi et al. |

FOREIGN PATENT DOCUMENTS

| EP | 0 357 309 | 3/1990 |
|---|---|---|
| WO | WO 2013/082197 | 6/2013 |

OTHER PUBLICATIONS

International Search Report for PCT/IB2015/052103 dated Jun. 9, 2016.

* cited by examiner

*Primary Examiner* — John A Tweel, Jr.
(74) *Attorney, Agent, or Firm* — Pillsbury Winthrop Shaw Pittman, LLP

(57) ABSTRACT

The invention relates to a system for tracking the location and activities of one more persons, such as prisoners, persons under house arrest or persons who have to perform community service.

10 Claims, 1 Drawing Sheet

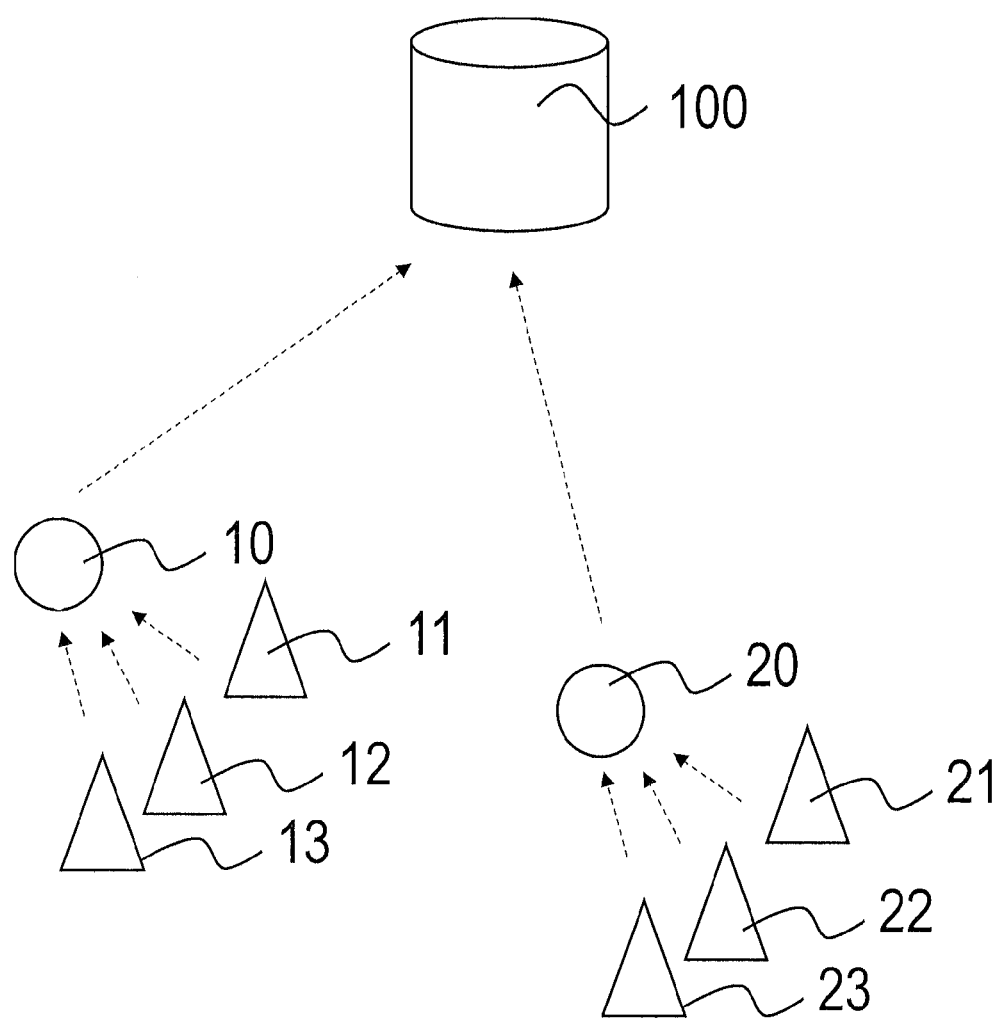

SYSTEM FOR TRACKING THE LOCATION AND ACTIVITIES OF PERSONS

CROSS-REFERENCE TO RELATED APPLICATIONS

This is the U.S. National Stage of PCT/IB2015/052103, filed Mar. 23, 2015, which in turn claims priority to Belgium Application No. 2014/0195, filed Mar. 24, 2014, the entire contents of all applications are incorporated herein by reference in their entireties.

FIELD OF THE INVENTION

This invention relates to a system for tracking the activities and locations of persons such as prisoners, persons under house arrest or persons who have to perform community service.

BACKGROUND OF THE INVENTION

Monitoring the location of persons is known in the art and used, inter alia, by law enforcement and in hospitals. These systems are limited to monitoring the location of one or more persons, usually for the purpose of physically confining an individual to a designated area, or for the purpose of monitoring a particular medical parameter, such as the heart rate, of an individual at a known position, e.g. see EP 0 357 309 A2.

The known systems for tracking of prisoners make use of an anklet device or a bracelet. Such an anklet or bracelet comprises a sensor, such as a GPS (Global Positioning System) sensor, for determining the position. Herewith it is possible to track the position of the prisoner or the person under house arrest. An anklet works together with an apparatus connected to the telephone(line) in the home of the prisoner. If the prisoner strays more than a specified distance from this apparatus, a central office will be automatically contacted, or, the apparatus may be interrogated about the presence or absence of the prisoner by the central office at regular intervals.

It is also already known to oblige prisoners with an anklet to perform community service at institutions and/or organizations such as for example in nonprofit organizations. A disadvantage is that the obligatory task performed by the person with an anklet is not registered using the anklet. Such an organization or institution is thus obliged to assign one or more supervisory persons in order to check and control the activities of the required task. Furthermore it is also not possible to have one or more persons with an anklet or groups of persons with anklets perform specific tasks and assignments along a predetermined route without being accompanied by one or more supervisory persons.

A further disadvantage is that supervisory persons are not able remotely, for example at a central office, to track, manage and eventually update the activities, tasks and execution of these tasks by persons with an anklet.

SUMMARY OF THE INVENTION

It is an object of the present invention to remotely track and manage activities and tasks of persons with an anklet, bracelet or wristlet during the execution of a task.

An advantage of the invention is that the activities, tasks and execution of the tasks by the prisoners can be tracked and managed at a central location, such as at a government office or at a police station. These tasks or activities may be remotely changed: either immediately or when a prisoner has covered a certain distance or when part of a task has been completed.

A further advantage is that the number of supervisory persons from government or from organizations can be substantially reduced or are even no longer necessary.

A further advantage is that the obligatory task no longer needs to be executed at an organization. The prisoner with an anklet can be sent out to perform certain tasks along a specific path, along a defined route or in an imposed zone. These activities and tasks can be tracked and managed centrally. Also the position, location or area where these activities and tasks have to be executed, can be changed, monitored and managed at a central location.

A further advantage is that, when a prisoner with an anklet has to execute a task using tools and/or equipment, the location of these tool(s) and/or equipment, the relative position of these tool(s) and/or equipment with regard to the anklet and specific movements of these tool(s) and/or equipment can be registered in combination with data of the anklet, such as the position of the prisoner. Therefore one or more sensors are attached to the tool(s) to be used and/or to the equipment to be used, such as for example to a brush and to a wheelbarrow.

A further advantage is that a specific task or activity can be recognized using pattern recognition. For example, the movement of a paintbrush can be stored, recognized using pattern recognition technology and compared with the assigned paint task, for example the removal of graffiti under a bridge.

A further advantage is that all activities and tasks are recorded in detail. As such, judges, police and assisting staff are provided with a detailed overview of the execution of the task and the activity at defined positions by each person with an anklet who has to perform community service.

BRIEF DESCRIPTION OF THE DRAWINGS

FIG. 1 is a schematic diagram of the system for tracking the location and activities of persons.

DETAILED DESCRIPTION OF THE INVENTION

A typical example of the invention relates to cleaning of streets along specific routes by one or more (groups of) prisoners with an anklet, or by one or more (groups of) persons who have to execute an obligatory task. Referring now to FIG. 1, an anklet 10 comprising a GPS sensor or a bracelet 20 comprising a GPS sensor is attached to each prisoner. Furthermore each prisoner has to carry tools 11, 12, 13, 21, 22, 23 such as a brush and wheelbarrow. Each of these tools comprises one or more sensors with which the location of these tools 11, 12, 13, 21, 22, 23, the relative position of these tools 11, 12, 13, 21, 22, 23 with regard to the anklet 10 and the movement of these tools 11, 12, 13, 21, 22, 23 are registered. The position of the prisoner(s) in combination with the activity data of the tools 11, 12, 13, 21, 22, 23, which the prisoner(s) use, are sent to a server 100 at a central location, such as for example a police station. The activity of the prisoner(s) can be immediately recognized using pattern recognition technology. This activity can be compared with the assigned task, for example sweeping or not sweeping during the assigned task. Furthermore everything can be registered for subsequent follow up by judges, police, prison staff and/or assisting staff.

Each anklet 10 can communicate with a display in for example a mobile phone or wristlet 20. The route along which the assigned task or tasks need to be executed is shown on this display.

The tasks, routes and times at which these tasks are to be executed, can be stored in the anklet 10 in advance. However it is also possible that the central server 100 sends the tasks, routes and times to the anklet 10 or that the central server 100 adjusts a predefined route, task or time. Each anklet 10 will emit an alarm or show a message, if a prisoner diverges from the assigned route or if activities are not corresponding to the assigned tasks.

Each anklet 10 comprises a sender/receiver to send sensor data to the central server 100 and to receive tasks, routes and associated data from the central server 100. Moreover each anklet 10 comprises another sender/receiver to communicate with the sensor(s) in the tools 11, 12, 13, 21, 22, 23 that the prisoner requires to execute the task along the assigned route. The relative position of these tools 11, 12, 13, 21, 22, 23 with respect to the anklet 10 and the movements of these tools 11, 12, 13, 21, 22, 23 may be determined in the anklet 10 or the calculation thereof can take place at the central server 100.

Every tool comprises a sender/receiver in order to communicate with an anklet 10 and/or with the central server 100, and one or more sensors such as one or more motion sensors, acceleration sensors and weight sensors. Eventually the sender/receiver and the sensors can be mounted on a device that will be attached to or mounted to a tool.

The central server 100 is installed at a central secure location. Communication between anklet 10 and the central server 100 and eventually between the tools 11, 12, 13, 21, 22, 23 and the central server 100 may happen via wireless communication (GSM, UMTS, 3G, 4G, satellite, or another wireless standard). The central server 100 manages the activities, tasks, routes and positions of the one or more (groups of) prisoners with an anklet 10. This central server 100 stores all data of each prisoner: sensor data of each anklet 10, sensor data of each tool, route information, activity information, task data, various information such as time and date. This central server 100 is not necessarily implemented as only a single central server 100, but can also be implemented in a distributed manner: database server, backup server, Internet server, intranet server, main server, etc.

The whole system can be managed at an activities and tasks center. In this center multiple workstations are installed for management tasks, such as the follow up of tasks and adapting routes and tasks for one or more prisoners.

A global overview can be shown on a map which is displayed on multiple displays or which is projected. The task and activity data of prisoner(s) is displayed on this map. Furthermore judges, police and assisting staff are able to remotely consult this data. The storage, display and consulting of this data is secured using coding technology, such as encryption and authentication. The tools 11, 12, 13, 21, 22, 23 and/or anklet 10 can be stored in a kiosk. Upon reading the identity card of the prisoner or upon reading biometric data of the prisoner, the kiosk displays the task that the prisoner is obliged to execute and the kiosk provides an anklet 10 and one or more tools 11, 12, 13, 21, 22, 23. After the prisoner has executed the obliged task, the anklet 10 and the tools 11, 12, 13, 21, 22, 23 have to be returned to the kiosk. A kiosk comprises suitable recharging means and furthermore each kiosk is also able to send sensor data and activity data to the central server 100.

Sometimes it is difficult to determine the position using GPS, such as in an underground train or metro station, under a bridge or in a tunnel. If GPS reception and GPS data are not available, the last known position can be stored in the anklet 10 or in the tool, for instance before entering such an environment. Activity data such as the relative position of tool(s) 11, 12, 13, 21, 22, 23 with respect to the anklet 10 and motion data of the tool(s) 11, 12, 13, 21, 22, 23 can be determined in such environments and can be temporarily stored. Communicating with a central server 100 is in such environments usually not possible and the sending of the data to the central server 100 is than postponed until there is again contact with the central server 100 possible.

Further examples of tasks relate to cleaning and/or clearing up of beaches and/or forests, festival sites, convention centers, airports, harbors, train stations, subway stations, etc. A further example of a task is the removal of graffiti.

The invention claimed is:

1. A system for managing and tracking activities and tasks of one or more persons, wherein each person wears an anklet, bracelet or wristlet comprising a GPS sensor for determining a position of that person, wherein the system comprises:
   a. one or more tools associated with each person, wherein the one or more tools each comprise an accelerometer configured to determine a relative position of each tool with respect to the person with the anklet, bracelet, or wristlet, such that the activities of each person are registered,
   b. a central server for storing, tracking and managing of the position of each person in combination with the activity data of this person.

2. The system as claimed in claim 1, wherein the position and motion of each tool is also registered.

3. The system as claimed in claim 1, wherein a connection between the central server, the one or more tools, and the anklet, bracelet or wristlet of each person is secured using encryption.

4. The system as claimed in claim 1, wherein the central server comprises a pattern recognition function, which recognizes and stores the activity data of each person.

5. The use of the system as claimed in claim 1 for managing and tracking the activities and tasks of prisoners with an anklet or of persons which have to perform community service.

6. A method for managing and tracking activities and tasks of one or more persons comprising:
   a. determining, using a GPS sensor, a position of one or more persons with an anklet, bracelet or wristlet,
   b. determining, using an accelerometer, a relative position of one or more tools associated with each person with respect to this person in order to register an activity of each person,
   c. sending the position of each person in combination with the relative position of the one or more tools used by this person to a central server, so that the activities of this person are tracked and managed.

7. The method as claimed in claim 6, wherein the position and motion of the one or more tools associated with each person are also registered.

8. The method as claimed in claim 6, wherein sending the position and activity data to the server is secured using encryption.

9. The method as claimed in claim 6, wherein pattern recognition is applied on the activity data in order to recognize activities.

10. The use of the method as claimed in claim 6 for tracking and managing activities and tasks of prisoners with an anklet or of persons who have to perform community service.

\* \* \* \* \*